United States Patent [19]

Yoshida

[11] Patent Number: 5,341,418

[45] Date of Patent: Aug. 23, 1994

[54] ISDN TERMINAL ADAPTER FOR ACCESS FROM ANALOG SIGNAL EQUIPMENT OF FOUR-WIRE FULL DUPLEX TYPE TO ISDN

[75] Inventor: Atsushi Yoshida, Tokyo, Japan

[73] Assignee: NEC Corporation, Tokyo, Japan

[21] Appl. No.: 924,884

[22] Filed: Aug. 6, 1992

[30] Foreign Application Priority Data

Aug. 6, 1991 [JP] Japan .................................. 3-196761

[51] Int. Cl.⁵ ...................... H04M 11/06; H04M 3/22
[52] U.S. Cl. .................................... 379/399; 379/402; 379/32; 379/2; 379/12; 379/26; 379/221; 370/14; 370/16.1; 370/16
[58] Field of Search .................... 379/2, 12, 26, 32, 33, 379/34, 221, 397, 399, 402; 370/14, 16, 16.1

[56] References Cited

U.S. PATENT DOCUMENTS

| 4,076,961 | 2/1978 | Holsinger et al. ...................... 379/2 |
| 5,210,740 | 5/1993 | Anzai et al. ............................ 370/16 |

FOREIGN PATENT DOCUMENTS 488610A  3/1992  European Pat. Off. ............ 379/242

Primary Examiner—James L. Dwyer
Assistant Examiner—Paul A. Fournier
Attorney, Agent, or Firm—Foley & Lardner

[57] ABSTRACT

In order to back up by an ISDN line two analog lines connected to MODEM of a four wire full duplex type for data transmission and reception, a terminal adapter is connected to a pair of back-up ports. Dial pulse signals delivered through the back-up ports are detected and converted into an ISDN telephone number. A D-channel processor performs the call connection by use of the D-channel signal having the ISDN telephone number and an identifier of a particular one of B-channels. An outgoing analog data from the MODEM through one of the back-up ports is A/D converted and then transmitted on the particular B-channel to the ISDN line. An incoming digital data on the particular B-channel signal received at the terminal adapter is D/A converted and is supplied to the MODEM through the other of the back-up ports. Thus, the back-up is performed by use of a single B-channel on the ISDN line.

3 Claims, 3 Drawing Sheets

ISDN TERMINAL ADAPTER FOR ACCESS FROM ANALOG SIGNAL EQUIPMENT OF FOUR-WIRE FULL DUPLEX TYPE TO ISDN

BACKGROUND OF THE INVENTION

The present invention relates to an ISDN (Integrated Services of Digital Network System) terminal adapter and, in particular, to such a terminal adapter for connecting an analog signal equipment of a four-wire full duplex type to the ISDN line.

In the ISDN system, a digital subscriber line (DSL) extends from an exchanging office to a user's area. The DSL terminates to a network terminal (N.T.). A plurality of terminal equipments are connected to the network terminal and are, therefore, connected to the DSL through the network terminal.

According to CCITT (International Telegraph and Telephone Consultative Communication) recommendations I series, communication information and control signals are transmitted through different channels which are multiplexed in a time division fashion as a time division multiplex (TDM) signal. The TDM signal comprises two communication channels or B channels which are separately called B1 and B2 channels and a single control channel which is called D channel.

In the ISDN system, a virtual circuit is set up on a particular one of B1 and B2 channels through the exchanging office between a calling party of a terminal equipment and a called party of another terminal equipment by a data link establishment and a call control on the D channel in response to a call request from the calling party.

As terminal equipments, there are known a digital telephone set or sets, a facsimile set or sets, a personal computer set or sets, and the like.

In order to enable to access to the ISDN from existing terminal equipments not for ISDN, there are known terminal adapters.

In the prior art, an ISDN terminal adapter of an analog type is used for connecting an existing analog terminal equipment such as a telephone set for an analog line to the ISDN line. The analog port type terminal adapter has one or more analog ports to be connected to one or more telephone sets. Since the analog telephone set is a two-wire type, the known terminal adapter is arranged in a form of the two-wire type for each analog port.

In order to connect an analog signal equipment of a four-wire full duplex type to the ISDN line, two terminal adapters with a single analog port can be used. Alternatively, an adapter with two or more analog ports can be used with two ports being connected to the analog signal equipment. In both cases, two B-channels on the ISDN line can be used corresponding to the two terminal adapters or the two analog ports. Therefore, the analog signal terminal equipment unfortunately results in use of two B-channels for access to the ISDN line at a time.

In a case, for example, a data terminal equipment such as a personal computer performs transmission and reception of data with another data terminal equipment through an analog network, the data terminal equipment is connected through a modulator and demodulator (which is called MODEM) to two analog lines each being made of two wires. One analog line of two wires is for data transmission and the other is for data reception.

The MODEM usually has a line back-up function whereby occurrence of any fault in the currently used analog lines is detected and switching is performed from the fault lines to other analog lines for back-up. That is, the modem has a pair of current ports for data transmission and data reception and another pair of back-up ports for data transmission and data reception.

In order to back up the fault analog lines by the ISDN line, the back-up ports can be connected to the ISDN line through the analog port type ISDN terminal adapter or adapters. Two B-channels on the ISDN line are used for data transmission and data reception, as described above.

It is desired that only one of B-channels is used for the data transmission and data reception even for the analog signal equipment of the four wire full duplex type, the other B-channel can be left for use by other terminal equipments.

SUMMARY OF THE INVENTION

Accordingly, it is an object of the present invention to provide an ISDN terminal adapter which can connect the four wire full duplex analog signal equipment to the ISDN line with the data transmission and reception being performed through only one B-channel.

It is another object of the present invention to realize back-up of analog lines of a modem through an ISDN line by use of the ISDN terminal adapter.

A terminal adapter according to the present invention is for use in access from an analog signal equipment to ISDN (Integrated Services Digital Network), the analog signal equipment having a first and a second port for transmitting an outgoing analog signal and for receiving an incoming analog signal, respectively, and to be connected to a first and a second analog public telephone line, respectively, so as to use the first and the second analog public telephone lines as a transmitting line and a receiving line, respectively, and the ISDN including an ISDN subscriber's line to be connected to the terminal adapter, the ISDN subscriber's line transmitting a TDM (Time Division Multiplex) signal which comprises first and second communication information channels for conveying communication information and a control channel for conveying a control signal for data link establishment and call control. The terminal adapter comprises: input circuit means to be connected to the first port for receiving the outgoing analog signal as a received analog signal; analog-digital converting means coupled to the input circuit means for converting the received analog signal to an outgoing digital signal; interface circuit means to be connected to the ISDN subscriber's line for transmitting an outgoing TDM signal to and receiving an incoming TDM signal from the ISDN subscriber's line, the interface circuit means coupled to the analog-digital converting means for delivering the outgoing digital signal into a particular one of the first and the second communication information channels of the outgoing TDM signal, the interface circuit means deriving, as an incoming digital signal, a signal of the particular communication channel of the incoming TDM signal; digital-analog converting means coupled to the interface circuit means for converting the incoming digital signal into a converted incoming analog signal; and output circuit means to be connected to the second port of the analog signal equipment and coupled to the digital-analog converting means for delivering the converted analog signal as the incoming analog signal to the second port of the analog signal equipment.

The analog signal equipment sends out, as a call request, a first and a second selection signal through the first and the second ports, respectively. The terminal adapter further comprises: first detecting means coupled to the input circuit means for detecting the first selection signal to produce a first detected selection signal; second detecting means coupled to the output circuit means for detecting the second selection signal to produce a second detected selection signal; address converting means coupled to the first and the second detecting means for producing an ISDN telephone number signal corresponding to the first and the second detected selection signal; and control channel processing means coupled to the address converting means and responsive to the ISDN telephone number signal for producing a control channel signal as a call connection request, the control channel signal comprising the ISDN telephone number signal and a channel indicator representative of a particular one of the first and the second communication information channels to be connected; the interface circuit means coupled to the control channel processing means and responsive to the control channel signal for delivering the control channel signal into the control channel of the outgoing TDM signal, to thereby establish a virtual communication line on the particular communication information channel.

The interface circuit means derives, as an incoming control channel signal, the control channel from the incoming TDM signal to deliver the incoming control channel signal to the control channel processing means. The control channel processing means decides whether or not the incoming control channel signal has a call setup signal and an ISDN subscriber's number signal assigned thereto, the control channel processing means producing a first and a second driving signal when the incoming control channel signal has the call setup signal and the ISDN subscriber's number signal. The terminal adapter further comprises: first ringing signal generating means coupled to the control channel processing means and to the input circuit means and responsive to the first driving signal for generating a first ringing signal to deliver the first ringing signal to the analog signal equipment through the first port; and second ringing signal generating means coupled to the control channel processing means and to the output circuit means and responsive to the second driving signal for generating a second ringing signal to deliver the second ringing signal to the analog signal equipment through the second port.

DESCRIPTION OF PREFERRED EMBODIMENTS:

Prior to description of preferred embodiments of the present invention, known back-up systems for analog lines by an ISDN line are described for the sake of better understanding of the present invention with reference to the drawings.

Figure 1:
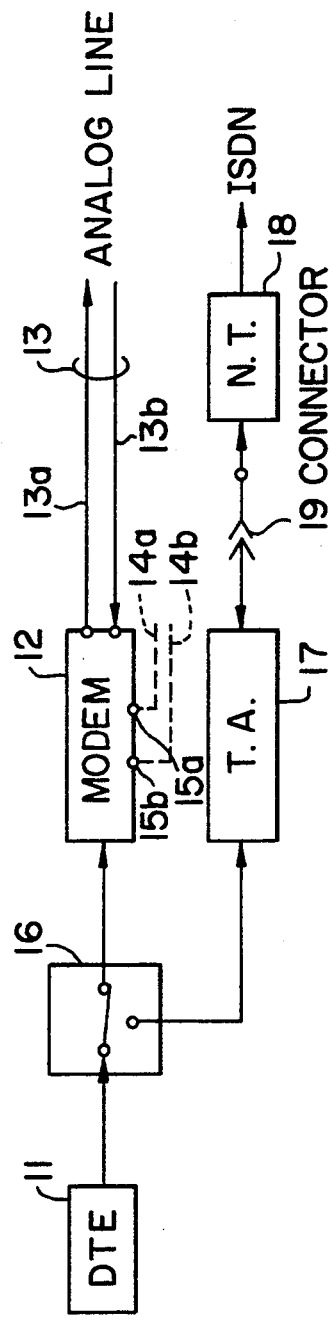
FIG. 1 is a block diagram view illustrating a known back-up system for backing up analog lines for data transmission and reception by an ISDN line.

Referring to FIG. 1, in order to perform data transmission and reception by a data terminal equipment (DTE) 11 through an analog line, a modulator and demodulator (MODEM) 12 is used between the data terminal equipment 11 and the analog line 13. The modem 12 modulates the data signal from the data terminal equipment 11 into the analog signal to deliver the analog signal to the analog line 13. The modem 12 also receives an analog signal incoming through the analog line 13 and demodulates the analog signal into a digital data signal which is delivered to the data terminal equipment 11. The modem 12 usually uses the four wire full duplex system and therefore uses two analog lines, one 13a being for transmission of the analog data signal and the other 13b for reception of the analog data signal.

The modem 12 has a line back-up function. That is, the modem 12 detects occurrence of any fault of the analog lines 13a and 13b and then connects the modem 12 to the back-up lines 14a and 14b of analog public telephone lines shown by dotted lines in the figure. The modem 12 has a pair of back-up ports 15a and 15b for connecting the back-up analog lines 14a and 14b used for analog data signal transmission and reception, respectively.

In detail, when the modem 12 detects any fault of the currently used analog lines 13a and 13b, the modem 12 delivers a fault detected signal to the data terminal equipment 11. Then, the modem 12 cooperates with the data terminal equipment 11 and switches from the fault analog lines 13a and 13b to the back-up lines 14a and 14b. Then, selection signals or dial signals of subscriber's lines to which a destination modem is connected are delivered to the back-up lines 14a and 14b by a network control unit (not shown) and the data transmission and reception is performed through the back-up lines 14a and 14b after completion of connection with the destination modem. The network control unit is provided separately from the modem 12 but can be combined within the modem 12. In the system shown in FIG. 1, the modem 12 is provided with the function of the network control unit.

It is recently desired to use an ISDN line in place of the analog lines as the back-up line.

One possible method is to use a switch 16 and a known ISDN terminal adapter (T.A.) 17 of a digital type. As shown in FIG. 1, the data terminal equipment 11 is usually connected to the modem 12 through the switch 16. When the fault is detected, the data terminal equipment 11 controls the switch 16 to connect with the ISDN terminal adapter 17. The terminal adapter 17 is connected to the network terminal (N.T.) 18 through a connector 19. Thus, the data terminal equipment 11 can be backed up by the ISDN line through the switch 16, the terminal adapter 17, the connector 19 and the network terminal 18.

The modem 12 is usually provided with various functions such as test function as well as the fault detection and the network control function. In back-up condition through the switch 16 and the terminal adapter 17 by the ISDN line, the modem 12 is disconnected from the data terminal equipment 11, and therefore, it is impossible to use the various functions of the modem 12.

Figure 2:
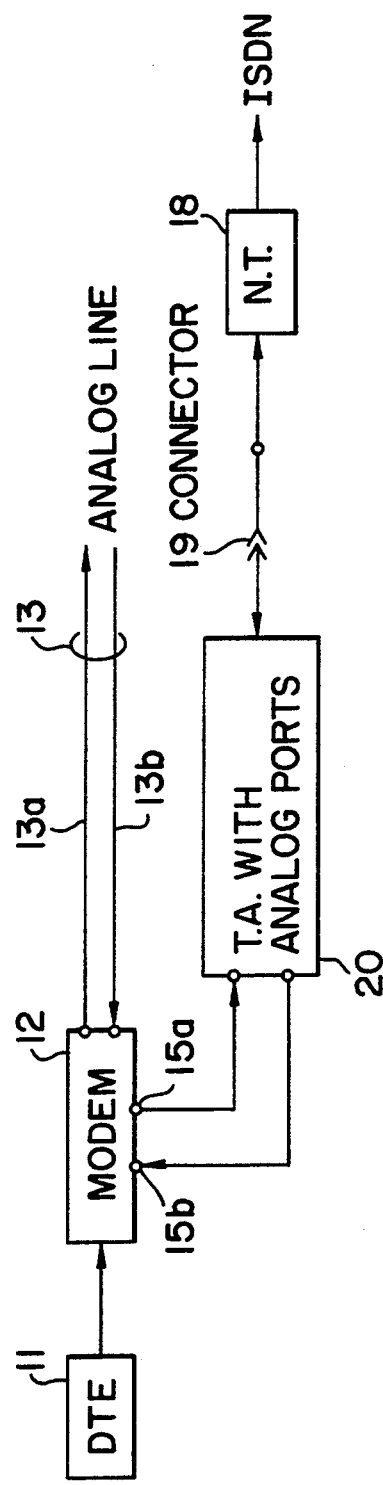
FIG. 2 is a block diagram view illustrating another known back-up system for backing up analog lines for data transmission and reception by an ISDN line.

Referring to FIG. 2, another back-up system can be realized by use of the analog port type terminal adapter 20. In detail, the back-up ports 15a and 15b are connected to two analog ports of the terminal adapter (T.A.) with analog ports 20 which is connected to the network terminal 18 through the connector 19. In this case, two B channels are used for data transmission and for data reception at a same time, as described in the preamble.

Figure 3:
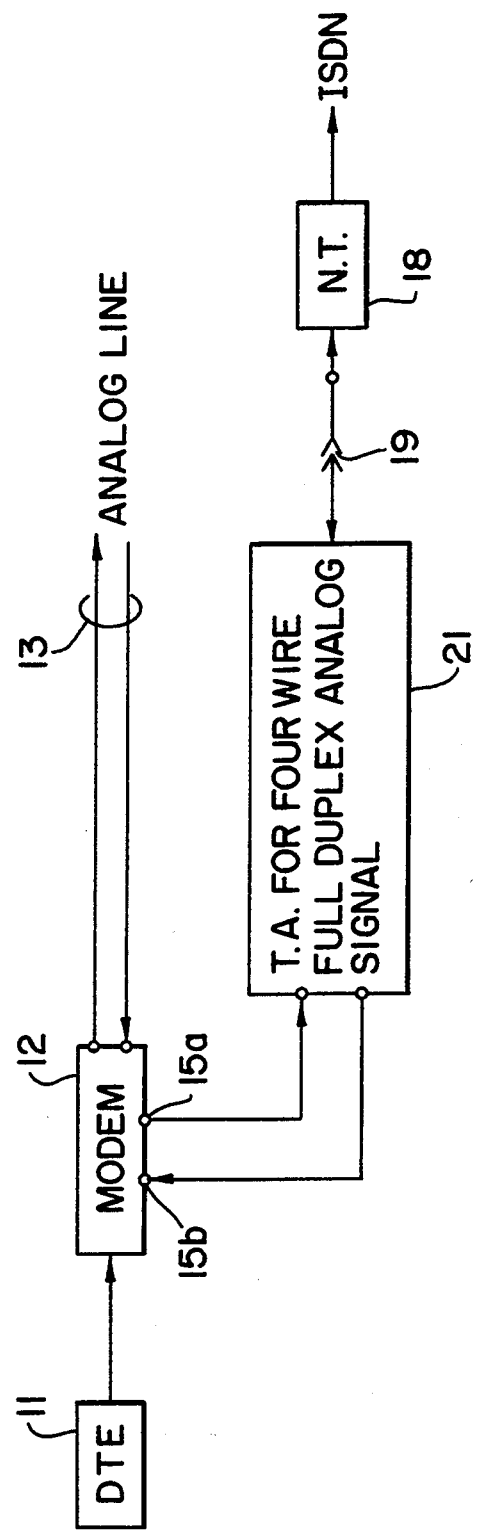
FIG. 3 is a block diagram view illustrating a back-up system using an ISDN terminal adapter according to an embodiment of the present invention.

Referring to FIG. 3, a terminal adapter for four wire full duplex analog signal 21 according to an embodiment of the present invention is connected to the pair of back-up ports 15a and 15b of the modem 12 in place of the terminal adapter with analog ports 20 in FIG. 2. The terminal adapter 21 can make access from the pair of back-up ports 15a and 15b to a single B-channel on the ISDN subscriber line, as described below.

Figure 4:
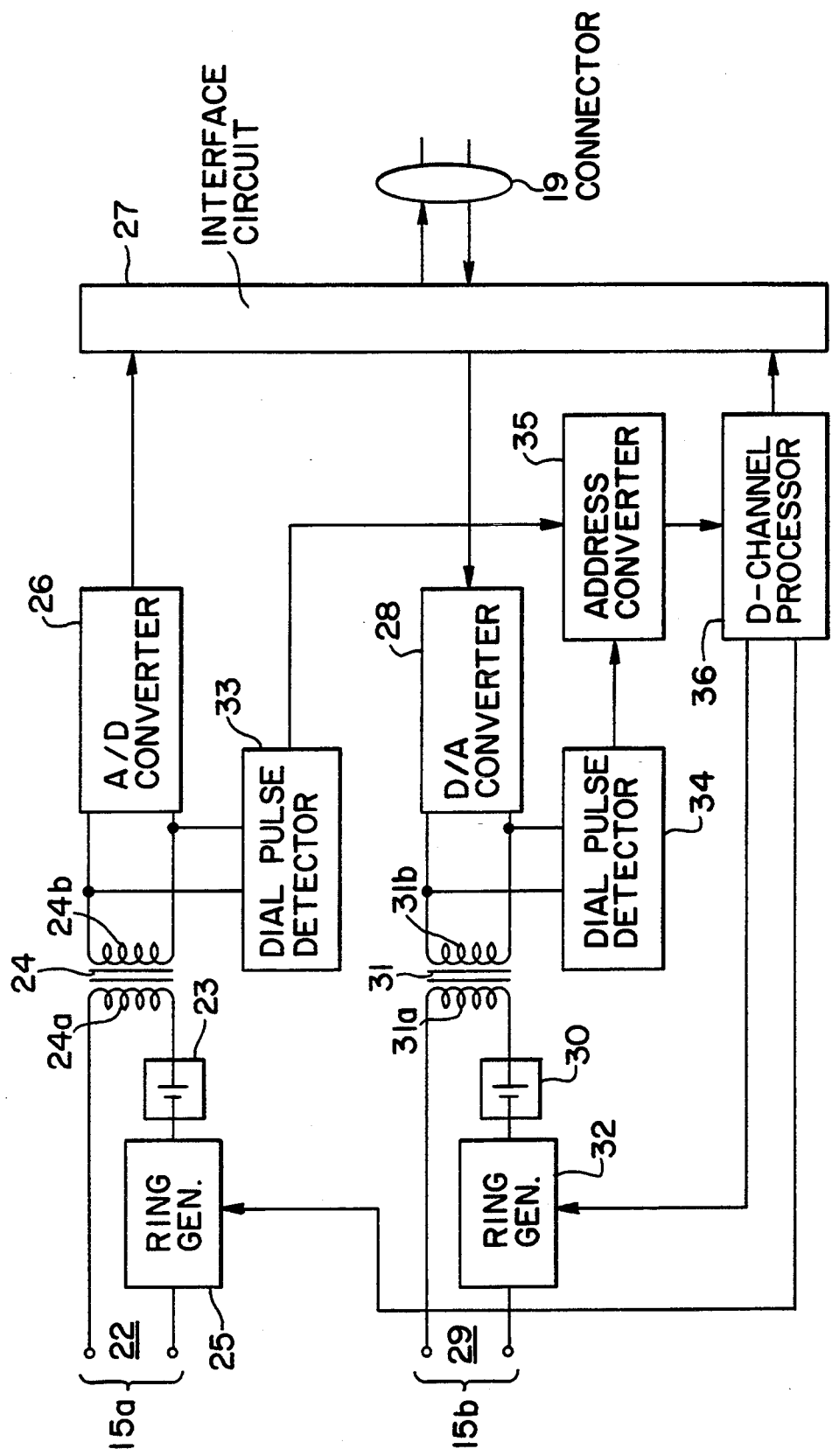
FIG. 4 is a block diagram view of the ISDN adapter according to an embodiment of the present invention and used in the system of FIG. 3.

Referring to FIG. 4, the terminal adapter 21 according to an embodiment of the present invention comprises an input circuit 22 to be connected to one 15a of the back-up ports which is a first port for transmitting an outgoing analog signal. The input circuit 22 comprises a DC power source 23 and a primary winding 24a of a transformer 24. The input circuit 22 receives the outgoing analog signal as a received analog signal.

A ringing signal generator 25 is connected to the input circuit 22 and is for generating a ringing signal to the modem 12 through the first port 15a when the terminal adapter 21 is called by a calling party, as described hereinafter.

The input circuit 22 and the ringing signal generator 25 are equivalent to an analog public telephone line for the first port 15a of the modem 12.

An analog-digital (A/D) converter 26 is coupled to a secondary winding 24b of the transformer 24. The analog-digital converter 26 converts the received analog signal to an outgoing digital signal.

An interface circuit 27 is connected to an ISDN subscriber's line through the connector 19 for transmitting an outgoing TDM signal to and receiving an incoming TDM signal from the ISDN subscriber's line. The interface circuit 27 is also coupled to the analog-digital converter 26 and delivers the outgoing digital signal into a particular one of B1 and B2 channels of the outgoing TDM signal.

The interface circuit 27 derives, as an incoming digital signal, a signal of the particular one of B1 and B2 channels of the incoming TDM signal.

A digital-analog (D/A) converter 28 is coupled to the interface circuit 27 and converts the incoming digital signal into a converted analog signal.

An output circuit 29 is connected to the other port 15b of the back-up ports of the modem 12 which is a second port for receiving an incoming analog signal.

The output circuit 29 comprises a DC power source 30 and a secondary winding 31a of a transformer 31. A ringing signal generator 32 is also connected to the output circuit 29 and is for generating a ringing signal to the modem 12 through the second port 15b when the terminal adapter 21 is called by a calling party, as described hereinafter.

The output circuit 29 and the ringing signal generator 32 are equivalent to an analog public telephone line for the second port 15b of the modem 12.

The digital-analog converter 28 is connected to a primary winding 31b of the transformer 31 and is, therefore, coupled to the output circuit 29. The output circuit 29, therefore, delivers the converted analog signal as the incoming analog signal to the second port 15b of the modem 12.

Accordingly, the modem 12 can perform transmission and reception of data signal through a particular one of B1 and B2 channels on the ISDN subscriber's line.

At start of the back-up mode, the modem 12 sends out, as a call request, a first and a second selection signal through the first and the second ports 15a and 15b, respectively.

The terminal adapter 21 further comprises first dial pulse detector 33 coupled to the input circuit 22 through the transformer 24. The first dial pulse detector 33 detects the first dial pulse or the first selection signal to produce a first detection selection signal.

A second dial pulse detector 34 is also coupled to the output circuit 29 through the transformer 31. The second dial pulse detector 34 detects the second dial pulse or the second selection signal to produce a second detected selection signal.

An address converter 35 is coupled to the first and the second dial pulse detectors 33 and 34 and produces an ISDN telephone number signal corresponding to the first and the second detected selection signals.

A control channel processor or a D-channel processor 36 is coupled to the address converter 35. Responsive to the ISDN telephone number signal, the D-channel processor 36 produces a control channel signal as a call connection request. The control channel signal comprises the ISDN telephone number signal and a channel indicator representative of a particular one of B1 and B2 channels to be connected.

The interface circuit 27 is coupled to the D-channel processor 36. Responsive to the control channel signal, the interface circuit 27 delivers the control channel signal into the D-channel of the outgoing TDM signal. So that a virtual communication line is established on the particular one of B1 and B2 channels.

Thus, data transmission and reception is performed on the particular one of B1 and B2 channels, as described above.

The interface circuit 27 derives, as an incoming D-channel signal, the D-channel from the incoming TDM signal and delivers the incoming D-channel signal to the D-channel processor 36. The D-channel processor 36 decides whether or not the incoming D-channel signal has a call setup signal and an ISDN subscriber's number signal assigned thereto. The D-channel processor 36 produces a first and a second driving signal when the incoming D-channel signal has the call setup signal and the ISDN subscriber's number signal.

The first and the second driving signals are supplied to the ringing signal generators 25 and 32. Then, the ringing signal generators 25 and 32 are responsive to the first and the second driving signals and generate first and second ringing signals.

The first and the second ringing signals are supplied to the modem 12 through the first port 15a and the second port 15b, respectively.

Thus, the modem 12 can answer the call setup signal.

What is claimed is:

1. A terminal adapter for use in access from an analog signal equipment to ISDN (Integrated Services Digital Network), said analog signal equipment having a first and a second port for transmitting an outgoing analog signal and for receiving an incoming analog signal, respectively, and to be connected to a first and a second analog public telephone line, respectively, so as to use said first and said second analog public telephone lines as a transmitting line and a receiving line, respectively, and said ISDN including an ISDN subscriber's line to be connected to said terminal adapter, said ISDN subscriber's line transmitting a TDM (Time Division Multiplex) signal which comprises first and second communication information channels for conveying communication information and a control channel for conveying a control signal for data link establishment and call control, said terminal adapter comprising:

- input circuit means to be connected to said first port for receiving said outgoing analog signal as a received analog signal;
- analog-digital converting means coupled to said input circuit means for converting said received analog signal to an outgoing digital signal;
- interface circuit means to be connected to said ISDN subscriber's line for transmitting an outgoing TDM signal to and receiving an incoming TDM signal from said ISDN subscriber's line, said interface circuit means coupled to said analog-digital converting means for delivering said outgoing digital signal into a particular one of said first and said second communication information channels of said outgoing TDM signal, said interface circuit means deriving, as an incoming digital signal, a signal of the particular communication channel of the incoming TDM signal;
- digital-analog converting means coupled to said interface circuit means for converting said incoming digital signal into a converted analog signal; and
- output circuit means to be connected to said second port of said analog signal equipment and coupled to said digital-analog converting means for delivering said converted analog signal as said incoming analog signal to said second port of said analog signal equipment.

2. A terminal adapter as claimed in claim 1, said analog signal equipment sending out, as a call request, a first and a second selection signal through said first and said second ports, respectively, said terminal adapter further comprising:

- first detecting means coupled to said input circuit means for detecting said first selection signal to produce a first detected selection signal;
- second detecting means coupled to said output circuit means for detecting said second selection signal to produce a second detected selection signal;
- address converting means coupled to said first and said second detecting means for producing an ISDN telephone number signal corresponding to said first and said second detected selection signals; and
- control channel processing means coupled to said address converting means and responsive to said ISDN telephone number signal for producing a control channel signal as a call connection request, said control channel signal comprising said ISDN telephone number signal and a channel indicator representative of a particular one of said first and said second communication information channels to be connected;
- said interface circuit means coupled to said control channel processing means and responsive to said control channel signal for delivering said control channel signal into said control channel of said outgoing TDM signal, to thereby establish a virtual communication line on said particular communication information channel.

3. A terminal adapter as claimed in claim 2, wherein said interface circuit means derives, as an incoming control channel signal, said control channel from said incoming TDM signal to deliver said incoming control channel signal to said control channel processing means; and said control channel processing means decides whether or not said incoming control channel signal has a call setup signal and an ISDN subscriber's number signal assigned thereto, said control channel processing means producing a first and a second driving signal when said incoming control channel signal has said call setup signal and said ISDN subscriber's number signal, said terminal adapter further comprising: first ringing signal generating means coupled to said control channel processing means and to said input circuit means and responsive to said first driving signal for generating a first ringing signal to deliver said first ringing signal to said analog signal equipment through said first port; and second ringing signal generating means coupled to said control channel processing means and to said output circuit means and responsive to said second driving signal for generating a second ringing signal to deliver said second ringing signal to said analog signal equipment through said second port.

* * * * *